Oct. 24, 1939.  S. B. MARTIN ET AL  2,177,184
PIPE COUPLING LOCK
Filed May 4, 1938
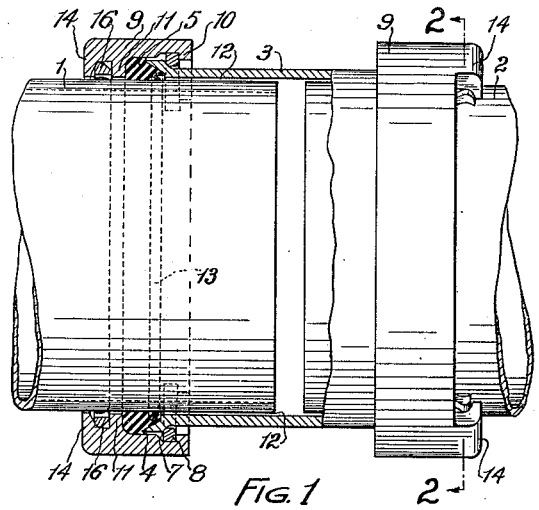
Fig. 1
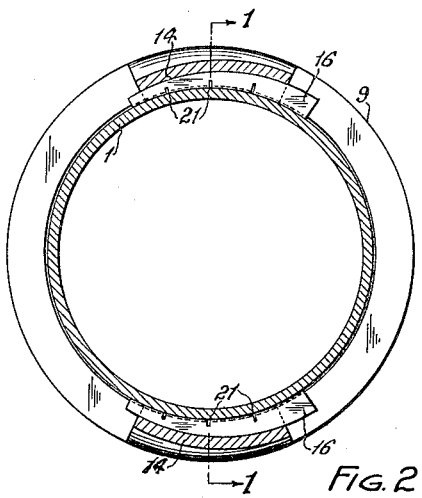
Fig. 2
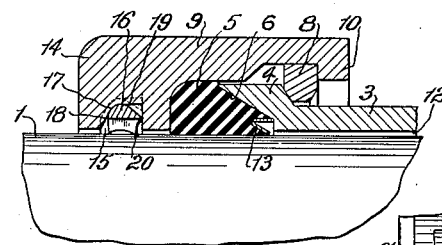
Fig. 3
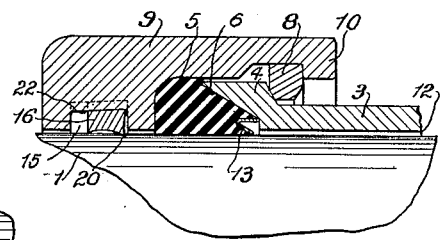
Fig. 4
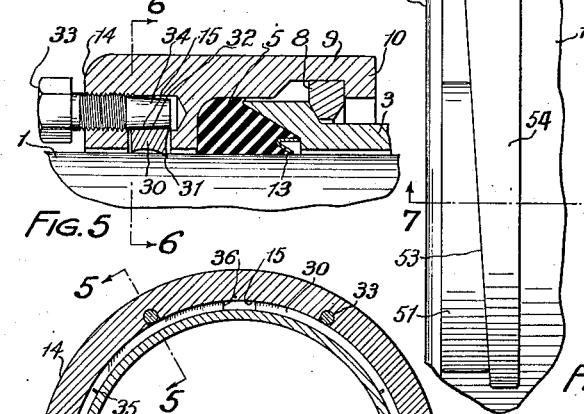
Fig. 5
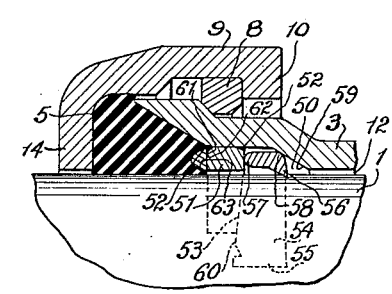
Fig. 7
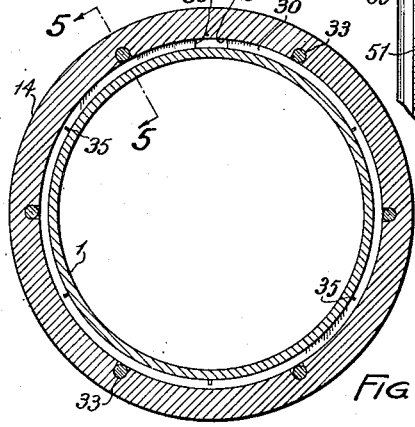
Fig. 6
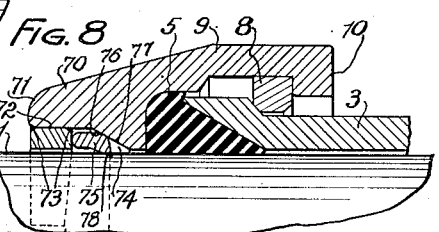
Fig. 8
Fig. 9
INVENTORS
Stoddard B. Martin and
BY Charles B. Waechter
Hawgood & Van Horn
Their ATTORNEYS Patented Oct. 24, 1939

2,177,184

UNITED STATES PATENT OFFICE 2,177,184

PIPE COUPLING LOCK

Stoddard B. Martin, Lakewood, Ohio, and Charles Bernard Waechter, Bradford, Pa.

Application May 4, 1938, Serial No. 205,958

5 Claims. (Cl. 285—196)

Our invention is an improvement in pipe couplings and relates more particularly to a locking means to prevent creeping of the end of the pipe section axially away from a coupling member carried thereon.

One of the objects of our invention consists in preventing sections of pipe from creeping outwardly of a coupling member thereon, by providing one or more removable locking members bitingly engageable with the section and with the coupling member.

Another object of the invention resides in providing a locking means for the purposes specified which is simple of construction, positive in operation, inexpensive to manufacture and readily applied or removed in use.

A further object of the invention consists in the provision of locking members which may be driven into place and which bitingly engage the outer wall of the pipe section and which may be applied in such a manner that the same may be driven circumferentially of the section in opposite directions from a point near the top portion of the coupling and section when a plurality of sections are assembled or coupled together in inaccessible places, such as a trench or ditch.

A further object of the invention is to provide in a pipe coupling a construction whereby as the pressure of fluid in the pipe increases, such pressure may be utilized to more effectively seal the pipe end in the coupling against leakage.

Another object is to provide for better sealing between the pipe section and the coupling by the use of a novel form of packing, the construction of which permits a substantially uniform application of sealing pressure and tends to prevent flowing of the packing material at the lesser cross-sectional areas of the same.

A further object of our invention resides in the application of one or more locking members within a suitable space provided within a coupling end cap or within a coupling connecting member or sleeve to bitingly engage the outer wall of the pipe end extending thereinto.

Another object consists in the provisions of means of the above named character which is effective even though the adjacent or coupled pipe sections are not in strict alignment and which under operating conditions will provide a strong, durable and effective lock whereby creeping of the pipe ends outwardly of the coupling will be eliminated.

Other objects and advantages of our invention will become more apparent from the following description of several embodiments of the same, reference being had to the accompanying drawing in which like reference characters are employed to designate like parts throughout the same.

In the drawing—

Figure 1 is a side view partly in section illustrating one form of our invention in which the locking members are carried by the end caps of the coupling;

Figure 2 is a transverse section taken on line 2—2 of Figure 1;

Figure 3 is an enlarged fragment view of a portion of Figure 1, and illustrates the locking members in pipe gripping position;

Figure 4 is a view similar to Figure 3 and illustrates a slightly modified form of locking member;

Figure 5 is a sectional fragment of a second form of our invention, and is taken on line 5—5 of Figure 6;

Figure 6 is a section taken on line 6—6 of Figure 5 illustrating how the locking ring bitingly engages the pipe section;

Figure 7 is a fragmentary section through another form of our invention, in which the locking means is housed within the coupling sleeve and is taken on line 7—7 of Figure 8;

Figure 8 is a plan fragmentary view of the locking member; and

Figure 9 illustrates a modified form of the invention shown in Figures 7 and 8, and shows the locking member housed within the end cap.

The embodiments of our invention illustrated in the drawing are of extremely simple construction and are very positive and effective in use.

It is desirable in coupling pipe sections together to properly seal the union against leakage. Due to frequent surges in the line however, there sometimes is a tendency for the pipe sections to creep outwardly of the coupling. When this occurs, leakage usually results.

By our invention we are enabled to successfully eliminate this tendency and to provide a strong, rigid coupling lock which not only prevents creeping of the pipe sections, but assists in maintaining a fluid tight seal between the coupling and the pipe ends at all times.

Referring now to the drawing, illustrating several embodiments of our invention, and more particularly to Figures 1 to 4 inclusive which illustrate one of these embodiments, the pipe ends 1 and 2 are carried within a connecting sleeve 3. Each end of the sleeve 3 is flared outwardly as at 4 to provide an annular packing receiving space between the sleeve and the adjacent pipe section. A suitable packing 5 of rubber or other material is provided as shown and has an inclined annular wall 6 which engages the inner inclined wall of the flared end of the sleeve.

The flared ends of the sleeve are provided with outer inclined walls 7 against which suitable wedges or keys 8 bear. An end cap or ring 9 is fitted over each end of the sleeve and adjacent pipe end as shown and comprises an annular member having inturned flanges 10 arranged at spaced intervals along its inner end, and providing therebehind a space for receiving the wedges or keys 8 as shown. The inner walls of the flanges 10 are tapered or inclined and as the wedges or keys 8 are driven in opposite directions along the inner walls of the flanges, they are wedged therein and draw the end cap axially inwardly of the sleeve 3 to compress the packing between the annular walls 4 and 11. As the packing is thus compressed, it tends to flow and seal the space between the outer pipe wall and the inclined wall 4 of the flange. It is to be noted in this connection that we have provided a novel form of packing having means associated therewith whereby to provide a more complete and effective seal. The walls of the packing member engaging the pipe and the flared end of the sleeve converge as shown so that the portion of the packing near and at the converging point is of greatly reduced cross-sectional area.

Therefore, normally there is a tendency for this portion of the packing to shift when there is a surge of pressure in the pipe which is communicated to the packing through the space 12. Leaks frequently occur in this manner between the pipe and the inner annular wall of the packing. To correct this condition we have provided a relatively stiff packing insert preferably of metal as at 13. This annular member is V-shaped in cross-section and fits snugly in a V-grove in the packing as shown. The head of the V-shape opens to normally spread the packing material against both the flared end of the sleeve and the pipe wall. When there is a surge in pressure of the fluid in the pipe, it is transmitted against the inner walls of the V-shaped annulus 13 and thereby presses the adjacent packing material equally against the sleeve and pipe walls. Thus, a better seal is effected in operation.

The end rings or caps 9 are each also provided with a plurality of flanges 14 spaced circumferentially and extending inwardly along the outer end of the caps to provide channels or spaces 15 with the members 11 for receiving the locking members 16. In Figure 3 the locking key 16 is provided with a rounded head portion 17 having rocking bearing engagement with the intersecting channel walls 18 and 19, while the pipe engaging portion of the key is formed with one or more teeth 20 for this purpose.

In Figure 2 we have indicated the manner of inserting the wedge locking keys so that they may be driven in opposite directions circumferentially of the pipe by means of a suitable tool.

Due to the fact that the keys 16 are tapered or wedge shaped from one end to the other and also that the inner walls of the channel 15 are similarly tapered, it will readily be seen that by driving the upper and lower keys 16 in Figure 2 in a counter-clockwise and a clockwise direction respectively, the teeth 20 of the keys will be caused to bite into the metal of the pipe and thereby prevent relative movement of the pipe outwardly of the sleeve. It will also be noted that because the locking keys 16 are carried within a channel of the end cap, the end cap will necessarily be required to take up the greater part of the outward strain caused by a surge in pressure within the pipe and that when this occurs, this strain will be partly transmitted through the cap, the packing and sleeve to the opposite end of the coupling.

In connection with this form of our invention we have increased the flexibility of the locking keys by slitting them inwardly from their inner walls at intervals as indicated at 21 in Figure 2. In this manner the keys will more readily respond in driving them into locking position. In Figure 4 we have illustrated a variation in the form of locking key 16 which consists in forming the same with a flat upper bearing surface 22 which is inclined transversely as well as circumferentially and which operates within a channel in a manner quite similar to that shown in Figure 2, to cause the teeth 20 to bite into the pipe and prevent the same from creeping under the conditions heretofore pointed out.

In use, the form of our invention described above is easily assembled. The two pipe ends are inserted into the coupling assembly including the end caps 14, packing 5 and the connecting sleeve 3 as shown. Then the clamping keys or wedges 8 are inserted behind the flanges 10 and driven circumferentially of the pipe in opposite directions wedging the parts together and compressing the packing on the pipe. This manner of assembly is similar to that disclosed in our Letters Patent Number 2,108,265, February 15, 1938. After these parts are thus assembled, the pipe may be firmly locked against creeping by applying the locking keys 16 in the channels 15 and driving them home in opposite directions.

In Figures 5 and 6 we have illustrated a second form of our invention which is similar in many respects to that form heretofore described, but differs in manner and means for locking the pipe against creeping.

In this form of the invention the end caps may each carry a removable contractible locking ring 30 within the channel 15. This ring is substantially rectangular in cross-section and is provided along its bottom or inner wall with circumferentially arranged teeth 31 which are caused to bite into the pipe material when the ring is contracted and thereby securely hold the pipe in a fixed position relative to the coupling. The upper or outer annular wall 32 of the ring is inclined slightly to the axis of the ring and is adapted to be slidably engaged by the series of bolts 33. Each of the locking bolts 33 is threaded into the depending flange 14 of the end caps and is tapered along its inner end as at 34. The tapered end of the bolts extends across the upper part of the channel 15 and engages the inclined outer wall 32 of the locking ring 30 as indicated in Figure 5.

As the bolts are tightened, the ring will be compressed and contracted about the pipe to cause the teeth 31 of the ring to bite into the pipe material. We have increased the flexibility of the locking ring by slitting the same at intervals inwardly from its inner wall. These slits are indicated at 35 and are preferably located between adjacent bolts 33 as illustrated in Figure 6.

The locking ring is continuous except for the split portion at 36 which enables the ring to be contracted by hand for inserting it into the channel 15 in assembling the device on the pipe sections.

We find that by employing a locking ring of this type the locking effort of the ring on the pipe is substantially equally applied throughout the circumference of the pipe through the teeth 31. Furthermore, the bolts are individually adjustable to control the biting effect of the teeth in the pipe for the respective ring sections between the slots 35.

In Figures 7, 8, and 9 we have illustrated another embodiment of our invention which is extremely simple of construction and inexpensive to manufacture. Figures 7 and 8 show the embodiment applied to a coupling in such a manner that any strain caused by a pressure surge in the pipe is imposed upon the connecting sleeve 3, while in Figure 9 we have modified the construction slightly to illustrate how this strain is imposed upon the end cap when there is a pressure surge in the pipe.

In Figure 7 the end of the connecting sleeve 3 is flared as shown at each end to provide an annular space 50 with the pipe 1. Into this space suitable bearing members 51 are secured to the inner wall of the sleeve as by welding at 52. There may be a plurality of these bearing members arranged in a spaced series circumferentially of the sleeve and we find in actual practice that one or two pairs is sufficient. It is to be noted that the inner side wall 53 of each bearing member is inclined or wedge shaped. When these bearing members are arranged in pairs, the direction of inclination of the walls 53 of the members of each pair is in opposite directions in the manner illustrated in Figure 2. This is for the purpose of more conveniently driving home the locking wedges 54 as has already been explained.

A locking wedge 54 is provided for each bearing member, and these wedges are removable from the space 50 by sliding the wedge circumferentially of the pipe in the space 50 in one direction until the wedge is free of the bearing. Similarly, the wedges may be driven in the opposite direction to lock the pipe in the coupling by inserting a tool between adjacent bearings into engagement with the enlarged end 55 of the wedge and then delivering sharp blows to the tool in the direction of travel of the wedge to bear against the bearing member 51.

Each of the wedges 54 is arcuate in shape and is provided along its inner side edge with a sharp projection 56 extending substantially radially inwardly toward the pipe to bitingly engage the pipe when the wedge is driven in one direction along the bearing member 51. The outer arcuate wall 57 of the wedge is preferably curved to provide a rolling point contact with the inclined side wall 53 of the bearing member, and likewise the upper inner wall 58 of the wedge is also curved to provide a similar contact with the downwardly and inwardly inclined wall 59 of the flared end of the sleeve. The wall 57 of each wedge is inclined in a circumferential direction as shown at 60 to properly engage the inclined wall 53 of the bearing member.

Thus it will be seen that as the wedge in Figure 7 is driven in a counter-clockwise direction looking at the right hand end, or as in Figure 8, the wedge will be shifted in a tilting direction about the points 57 and 58 to cause the arcuate projection or tooth 56 to bite into the metal of the pipe wall, thereby providing a positive and effective lock between the pipe and the coupling such as will prevent creeping of the pipe to the left out of the coupling when there is a pressure surge in the pipe.

From the above description it is evident that the strain of overcoming creeping of the pipe is borne almost entirely by the bearing member 51 and the sleeve 3. By this arrangement the end cap 9 may exert its full pressure upon the packing without the necessity of carrying the burden of preventing pipe creep.

In this form of our invention we also provide a bearing ring or annulus 61 having a flat inner bearing face 62 for contact with the outer side wall of the bearing members 51. The bearing ring converges outwardly at 63 and seats within a recess in the packing 5. By this construction the reduced cross sectional area of the packing occasioned by the converging walls of the pipe and the flared end of the sleeve 3 is supported more effectively against these walls and as the packing is compressed, a better seal at these points is assured.

In Figure 9 we have illustrated a slight modification of the embodiment illustrated in Figures 7 and 8. In this modification the parts are arranged so that the strains set up in overcoming pipe creep will be largely taken up by the end cap 9. The extreme outer portion of the end cap is of sturdier construction as indicated at 70 and terminates in an annular portion 71 overlying and spaced from the pipe 1.

A plurality of bearing members 72 are secured to the internal annular wall of the portion 71 by welding as at 73 and are arranged in a circumferentially spaced series as in the previous form described. The arcuate spaces 74 are provided between the cap and the pipe for receiving the arcuate wedges 75 in sliding relation with the bearing members. As in the similar modification the contacting walls of the bearing members 72 and the wedges 75 are inclined as shown while the outer arcuate side wall of each wedge 75 is rounded to provide a rolling sliding point bearing with the member 72.

Furthermore the upper inner side wall of the wedge is rounded at 76 to provide a similar restricted bearing with the inwardly and downwardly inclined wall 77 of the end cap 9. Each of the wedges is also formed with a projection 78 for biting engagement with the pipe wall 1 when the wedge is driven home along the bearing member 72 in the proper direction.

Thus when the wedges are driven to pipe locking position the projection will bite into the pipe material as shown and will prevent the pipe from creeping to the left in the figure.

The form shown in Figures 7 and 8 is particularly designed for coupling and locking pipe sections of relatively large diameter and for this use it is desirable that the strains set up by a pressure surge in the pipe be primarily taken up by the sleeve 3.

In Figure 9 the construction shown is particularly useful for coupling and locking pipe sections of smaller diameter where these strains are not as great, and we have found it advantageous in this form to take up these strains in the end cap 9. This construction has the further advantage of providing better access for applying and removing the wedge members 75 without dismantling the coupling.

From the above description it will readily be understood that we have provided a simple, positive, and effective means for securely locking pipe sections in a coupling in such a manner as to improve the sealing of the pipe against leakage and to prevent pipe creep due to a surge in pressure in the pipe or to any other cause.

The several modifications illustrated are all broadly directed to such means as may include one or more wedging keys or members subject to wedging action by relative movement with another member carried by a part of the coupling.

Various changes in the details of construction and arrangement of parts may be made without departing from the spirit of the invention or the scope of the appended claims.

We claim:

1. In a pipe coupling, means for preventing pipe creep upon a surge in pressure in the pipe, said means including an end cap having a pair of circumferentially arranged channels therein, a member having an inclined bearing wall in each of said channels, the inclination of said walls being in opposed directions, and locking members in said channels and having portions slidably engaging said inclined walls and a projecting pipe engaging tooth adapted to bite into the material of the pipe when relative movement occurs between said respective locking members and the said inclined walls, said locking members being weakened substantially radially at spaced intervals to enable them to more readily conform to the arc of the channel and thereby substantially uniformly distribute the biting effort of the tooth on the pipe outer wall.

2. In a pipe coupling, means for preventing pipe creep upon a surge in pressure in the pipe, said means including an end cap having a channel therein, an inclined bearing member in said channel, and a locking member in said channel and having a projection engageable with the outer wall of a pipe section in the coupling and adapted to bite into said pipe wall when relative movement occurs between said locking member and said bearing, said locking member being also capable of a tilting motion during said relative movement with the bearing.

3. In a pipe coupling, means for preventing pipe creep upon a surge in pressure in the pipe, said means including an end cap having a pair of circumferentially arranged channels therein, a member having an inclined bearing wall in each of said channels, the inclination of said walls being in opposed directions, and locking members in said channels and having portions slidably engaging said inclined walls and a projecting pipe engaging tooth adapted to bite into the material of the pipe when relative movement occurs between said respective locking members and the said inclined walls, said locking members being weakened substantially radially at spaced intervals to enable them to more readily conform to the arc of the channel and thereby substantially uniformly distribute the biting effort of the tooth on the pipe outer wall, said locking members also being capable of a tilting motion toward the adjacent pipe section during said relative movement with the bearing.

4. In a pipe coupling the combination with a coupling member having arcuate channels therein, of means in said channels for preventing pipe creep due to a pressure surge in the pipe, said means including locking members of arcuate form and adapted to be movable circumferentially along said channels, said locking members and said channels having cooperating inclined walls to cause a portion of said locking members to bite into the pipe material when the locking members are driven along said channels in a predetermined direction, said locking members having a curved surface to permit tilting of the same in the channels when there is a tendency for the pipe to creep.

5. In a pipe coupling the combination with a coupling member having a portion spaced from a section of pipe therein, one of the inner walls of the coupling member defining the space being inclined toward said pipe, of means for preventing pipe creep due to a pressure surge in the pipe, said means including bearing members projecting inwardly of the coupling member into said space and formed with an inclined wall, toothed locking members in said space, and having an inclined wall slidable along said inclined wall of the bearing, said locking members having also a restricted wall portion for sliding engagement with the inclined wall of the coupling member whereby said locking member may be tilted toward said pipe section for biting engagement therewith as the locking members are driven home.

STODDARD B. MARTIN.
CHARLES BERNARD WAECHTER.